(12) United States Patent
De Mol et al.

(10) Patent No.: US 11,540,375 B2
(45) Date of Patent: Dec. 27, 2022

(54) POWER SUPPLY FOR AN LED LIGHTING UNIT

(71) Applicant: SIGNIFY HOLDING B.V., Eindhoven (NL)

(72) Inventors: Eugen Jacob De Mol, Vreden (DE); Christian Tenhumberg, Sint Oedenrode (NL); Marcel Beij, Sint Oedenrode (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 25 days.

(21) Appl. No.: 17/292,890

(22) PCT Filed: Nov. 19, 2019

(86) PCT No.: PCT/EP2019/081722
§ 371 (c)(1),
(2) Date: May 11, 2021

(87) PCT Pub. No.: WO2020/109068
PCT Pub. Date: Jun. 4, 2020

(65) Prior Publication Data
US 2021/0400783 A1    Dec. 23, 2021

(30) Foreign Application Priority Data
Nov. 30, 2018    (EP) .................................... 18209506

(51) Int. Cl.
H05B 45/37     (2020.01)
H05B 45/385    (2020.01)
H05B 45/382    (2020.01)

(52) U.S. Cl.
CPC ......... *H05B 45/385* (2020.01); *H05B 45/382* (2020.01)

(58) Field of Classification Search
CPC .... H05B 45/385; H05B 45/382; H05B 45/37; H05B 45/30; H05B 47/00; H02M 1/0032; H02M 3/285; H02M 1/0003; Y02B 70/10
See application file for complete search history.

(56) References Cited

U.S. PATENT DOCUMENTS

| | | | |
|---|---|---|---|
| 9,923,448 B2 * | 3/2018 | Nikitin | H02M 7/217 |
| 2006/0139965 A1 | 6/2006 | Gan et al. | |
| 2012/0163056 A1 | 6/2012 | Busch et al. | |
| 2012/0286681 A1 * | 11/2012 | Hausman, Jr. | H05B 41/295 315/200 R |
| 2014/0346874 A1 | 11/2014 | Fang et al. | |
| 2015/0194897 A1 | 7/2015 | Kim et al. | |

(Continued)

FOREIGN PATENT DOCUMENTS

| | | | |
|---|---|---|---|
| KR | 20150044335 A | * | 4/2015 |
| KR | 20150044335 A | | 4/2015 |
| WO | 2018203597 A1 | | 11/2018 |

*Primary Examiner* — Jimmy T Vu

(57) ABSTRACT

A power supply for an LED lighting unit. The power supply comprises two power converters, either of which may provide the power to be drawn by components of the LED lighting unit. In particular, a controller of the power supply controls which power converter converts a mains power supply to a power level for a connected LED lighting unit. The two power converters are designed to be efficient when providing different power levels.

15 Claims, 2 Drawing Sheets

(56) References Cited

U.S. PATENT DOCUMENTS

| | | | |
|---|---|---|---|
| 2015/0229223 A1* | 8/2015 | Cao | H02M 1/08 |
| | | | 363/21.13 |
| 2016/0153650 A1* | 6/2016 | Chien | F21V 33/0004 |
| | | | 362/253 |
| 2018/0116020 A1 | 4/2018 | Beghelli | |
| 2018/0177010 A1 | 6/2018 | Liu et al. | |
| 2019/0157978 A1* | 5/2019 | Ni | H02M 3/285 |

* cited by examiner

POWER SUPPLY FOR AN LED LIGHTING UNIT

CROSS-REFERENCE TO PRIOR APPLICATIONS

This application is the U.S. National Phase application under 35 U.S.C. § 371 of International Application No. PCT/EP2019/081722, filed on Nov. 19, 2019, which claims the benefit of European Patent Application No. 18209506.7, filed on Nov. 30, 2018. These applications are hereby incorporated by reference herein.

FIELD OF THE INVENTION

The invention relates to the field of LED lighting units, and in particular to power supplies for LED lighting units.

BACKGROUND OF THE INVENTION

Lighting units employing light emitting diodes (i.e. LED lighting units) are becoming increasingly common in light installations or luminaires, typically as a replacement for well-known halogen bulbs. LED lighting units typically comprise at least one LED arrangement, and are switchable between an ON-state, in which the LED arrangement(s) outputs light, and an OFF-state, in which the LED arrangement(s) does not output light.

There has been a recent trend towards including other components in an LED lighting unit to provide additional functionality beyond mere lighting, e.g. to provide sensing and/or communication functionalities. Examples of possible additional components to include in an LED lighting unit include: transmitters; receivers; transceivers; temperature sensors; motion sensors; ambient light sensors and so on.

However, there is a desire to continuously provide power to these additional components, even when the LED lighting unit is controlled to not emit light. There is therefore proposed the concept of a STANDBY-state, in which the LED arrangement(s) is not powered, but other components of the LED lighting unit are powered. This is distinguishable from an OFF-state, in which all components of the LED lighting unit are unpowered.

Existing power supplies for LED lighting units are designed to convert a mains voltage into a power level sufficient for driving the LED units. This power level is used to drive the LED arrangement (when the LED is in an ON-state) and other components of the LED lighting unit (when the LED lighting unit is in an ON-state or a STANDBY-state).

There is an ongoing desire to improve such power supplies.

SUMMARY OF THE INVENTION

The invention is defined by the claims.

According to examples in accordance with an aspect of the invention, there is provided a power supply for an LED lighting unit comprising at least one LED arrangement and at least one other component, the power supply comprising: an input terminal arrangement for receiving a mains power supply; an output terminal arrangement adapted to be connectable to the LED lighting unit and to define, when connected to the LED lighting unit, a power supplied to the LED lighting unit; a first power converter designed to convert a received mains power; a second power converter, separate to the first power converter, designed to convert a received mains power supply; a controller adapted to selectively control which of the first and second power converters converts the mains power supply and provides the converted mains power supply to the output terminal arrangement, to thereby switch a power supplied to a connected LED lighting unit between a power converted by the first power converter and a power converted by the second power converter, wherein: the first power converter is more efficient than the second power converting at converting the mains power supply when the converted mains power supply is at a first non-zero power level; and the second power converter is more efficient than the first power converting at converting the mains power supply when the converted mains power supply is at a second, different non-zero power level.

The proposed arrangement allows two different power converters to provide power to an LED lighting unit at a same output location (e.g. same pins or nodes of an output arrangement). By using two separate power converters, specific converters designed for different power levels can be used, thereby enabling efficient conversion of a mains supply power at both a first power level and a second, different power level to account for different levels of power drawn by the LED lighting unit. By providing a power at a same terminal arrangement (e.g. at the same pins of an output arrangement), the number of wires/connections between the power supply and the LED lighting unit is kept to a minimum.

In other words, each separate power converter can be tuned or designed for a (single) particular power level, enabling efficient power converter designs to be used (e.g. rather than less efficient variable power converters). This improves an energy efficiency of the overall power supply.

This enables the LED lighting unit to be switched between a powered or ON mode/state (where it draws power for driving all components of the LED lighting unit, including the LEDs) and a standby mode/state (where it draws power for driving only other components of the LED lighting unit, e.g. excluding the LEDs) whilst continuing to use an efficient power supply.

Each power converter is designed so as to be more/most efficient when providing a particular power level (e.g. when compared to that power converter providing other power levels). The skilled person would appreciate that different power converters can be designed so as to be particularly efficient when providing a certain power level, when compared to providing other power levels. In particular, different power converters may be different with respect to component values (e.g. inductance/capacitance values) or structures to be efficient for providing different power levels. This may, in examples where a power converter comprises a transformer, result in different power converters having transformers formed from different numbers of windings and/or materials.

The controller is designed to control which power converter supplies power to the output terminal arrangement, and thereby to a connected LED lighting unit. In other words, the controller is operable in a first state, in which only the output of the first power converter provides power to the output terminal arrangement (and not the output of the second power converter) and a second state, in which only the output of the second power converter provides power to the output terminal arrangement (and not the output of the first power arrangement). Thus, the controller may switch which power converter provides a power level to a connected LED lighting unit.

Such control may be performed by controlling whether an output of a power converter is connected to the output terminal arrangement and/or whether an input of a power converter is connected to the input terminal arrangement (e.g. by way of switches). Other ways of controlling which power converter provides power to the output terminal arrangement will be apparent to the skilled person.

In other words, the first and second power converters may be in parallel to one another, and alternately switched/controlled so as to provide power to the output terminal arrangement.

Of course, in embodiments, the controller may be further operable so that both the first and second power converter provide power to the output terminal arrangement and/or so that neither of the first and second power converters provide power to the output terminal arrangement (e.g. to completely switch the LED lighting unit off).

For the avoidance of doubt, it is noted that the first and second power levels are different to one another. In other words, the first power converter is designed to be efficient when providing/delivering a first power level (i.e. when a connected LED arrangement draws a first power level) and the second power converter is designed to be efficient when providing/delivering a second, different power level (i.e. when a connected LED lighting unit draws a second, different power level).

In particular examples, the second power level falls outside a range of ±1% or ±5% of the first power level or vice versa. That is, a difference between the first and second power levels may be no less than 1% of the value of the first power level or the second power level. Preferably, the difference between the first and second power levels is no less than 90% of the value of the first power level.

In embodiments, the first power converter is more efficient than the second power converter at converting the mains power supply when the converted mains power supply is within a first range of powers; and the second power converter is more efficient than the first power converter at converting the mains power supply when the converted mains power supply is within a second, different range of powers.

In some embodiments, the second power level may be lower than the first power level. In this way, the first power converter may act as a "high power converter" and the second power converter may act as a "low power converter". Thus, the first power converter may be more efficient at delivering a higher power level (e.g. >0.5 W or >5 W) than the second power converter.

Preferably, the first non-zero power level is sufficient to power the at least one LED arrangement of the LED lighting unit, and the second non-zero power level is not sufficient to power the at least one LED arrangement of the LED lighting unit.

In other words, the first power converter may be designed to provide a power drawn by an LED lighting unit in an ON-state (e.g. when the LED arrangement(s) are controlled to emit light). The second power converter may be designed to provide a power level drawn by the LED lighting unit in a STANDBY-state (e.g. when the LED arrangement(s) are controlled to not emit light).

In embodiments, the first power converter is adapted to provide a first non-zero voltage level, and the second power converter is adapted to provide a second, different non-zero voltage level.

Thus, not only may the power converters be designed for providing different levels of power, but they may also be designed to provide different non-zero voltage levels. This enables two different voltage levels to be controllably provided on the same pin(s) of the output terminal arrangement, and thereby on the power rail of the LED lighting unit.

Preferably, the first non-zero voltage level is greater than the second non-zero voltage level. Preferably, the first non-zero voltage level is greater than a voltage drop across the LED arrangement of the LED lighting unit, and the second non-zero voltage level is less than a voltage drop across the LED arrangement of the lighting unit.

Thus, the LED arrangement(s) of the lighting unit may not be able to draw power when the second voltage level (from the second power converter) is provided. This effectively switches the LED arrangement off.

In this way, control over which power converter provides power to the LED lighting unit can control a state of the lighting unit, e.g. whether the LED lighting unit is in an ON or STANDBY state. This enables simpler LED lighting units (e.g. without independent control) to be used with the power supply, decreasing a cost of replacement LED lighting units. In other words, control over the state of the LED lighting unit may be shifted to the power supply.

In embodiments, the first non-zero voltage level provides a voltage level greater than 25V and the second non-zero power level provides a voltage level less than 10V. In preferable embodiments, the second non-zero voltage level is a voltage level according to a standard, such as 5V or 3.3V.

In embodiments, the input terminal arrangement comprises: one or more pins for receiving the mains supply; an EMI filter circuit adapted to filter the mains supply; and a surge protection unit to protect the power supply from power surges in the mains supply.

The controller may be adapted to: determine whether the at least one LED arrangement of a connected LED lighting unit is drawing power; and in response to determining that the at least one LED arrangement of a connected LED lighting unit is not drawing power, connect the second power converter to the output terminal arrangement so that the power level supplied to the LED lighting unit is held at the second non-zero power level. This allows for automatic switching by the controller.

Preferably, the first power converter and/or the second power converter comprises a flyback converter. A flyback converter provides an efficient converter for generating a high power level.

The controller may comprise a switch adapted to selectively switch a connection to the output terminal arrangement between an output of the first power converter and an output of the second power converter, to thereby switch which power converter supplies power to the output terminal arrangement.

Thus, a switch may connect the output terminal arrangement to receive the power level provided by the first power converter or the power level provided by the second power converter (i.e. and not both simultaneously). This avoids potential power surges in the two power converters from affecting or damaging the other power converter.

Embodiments of the invention may provide a luminaire comprising: any described power supply, and an LED lighting unit connected to the output terminal arrangement of the power supply, the LED lighting unit comprising: a power rail adapted to receive a power level from the output terminal arrangement; at least one LED arrangement adapted to receive power from the power rail; and at least one other component adapted to receive power from the power rail.

The at least one LED arrangement may be adapted to require a power level greater than the second power level in order to emit light, and each at least one other component may be adapted to require a power level equal or less than the second power level in order to be active.

Thus, the power level required to run the at least one other components is less than the power level required to run the LEDs. To save power, when light output is not required, a second power converter may therefore provide a different power level (e.g. a lower power level) for powering the other component(s), where the second power converter can be designed to suit the power requirements for a second power converter, thereby providing a more efficient system.

Preferably, each at least one LED arrangement comprises a plurality of LEDs connected in series. The at least one other component may comprise a communication unit and/or a sensing unit. Examples include transmitters; receivers; transceivers; temperature sensors; motion sensors; ambient light sensors and so on.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
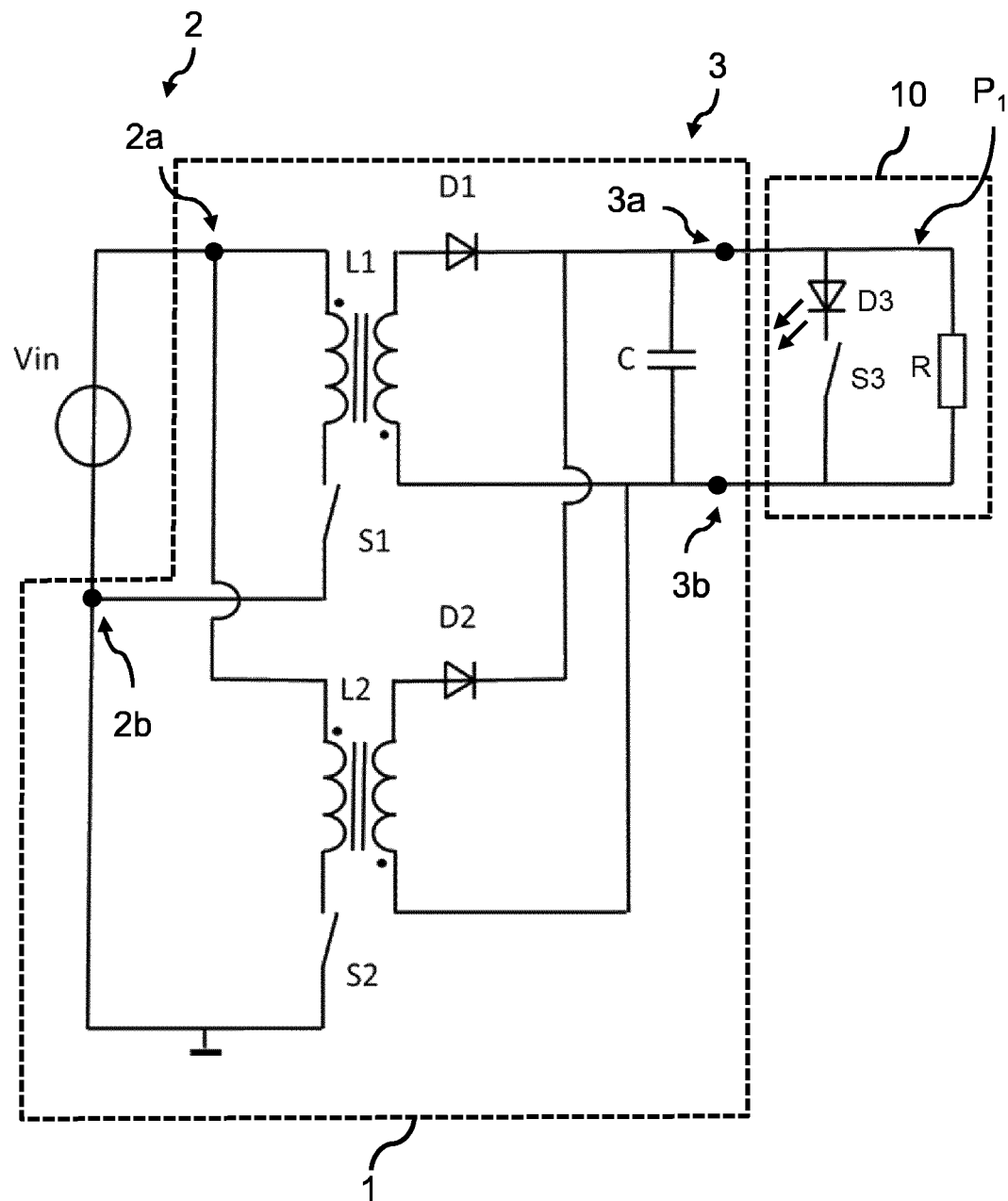
FIG. 1 is a circuit diagram illustrating a power supply according to an embodiment of the invention.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

According to a concept of the invention, there is proposed a power supply for an LED lighting unit. The power supply comprises two power converters, either of which may provide the power to be drawn by components of the LED lighting unit. In particular, a controller of the power supply controls which power converter converts a mains power supply to a power level for a connected LED lighting unit. The two power converters are designed to be efficient when providing different power levels.

Embodiments are at least partly based on the realization that a power converter is more efficient at providing some power levels than other power levels. Thus, a first power converter may be used when a first power level is required (e.g. for driving both LEDs and other components of the LED lighting unit), and a second power converter may be used when only a second, different power level is required (e.g. for driving only the other components of the LED lighting unit, and not the LEDs). This provides a more efficient and customizable power supply.

Illustrative embodiments may, for example, be employed in a luminaire or other lighting system.

FIG. 1 illustrates a circuit diagram for a power supply 1 for a connected LED lighting unit 10 according to an embodiment of the invention. A description of an example LED lighting unit 10 is hereafter provided to provide context to embodiments of the invention.

The LED lighting unit 10 comprises an LED arrangement D3 (e.g. formed of one or more LEDs), a LED switch S3 adapted to control whether (when the LED lighting unit is connected to the power supply) the LED arrangement D3 attempts to draw power to thereby output light and at least one other component R. The LED arrangement D3 and the at least one other component R draw power from a same power rail $P_1$.

When the LED switch S3 is closed, the LED lighting unit 10 is in an ON-state (and draws sufficient power to drive the LED arrangement D3 and the at least one other component R). When the LED switch S3 is open, the LED lighting unit 10 is in a STANDBY-state (and draws requires sufficient power to drive the at least one other component R).

The at least one other component R may comprise, for example: a processing unit, a control unit, a communication unit and/or a sensing unit. Suitable examples include microprocessors; transmitters; receivers; transceivers; temperature sensors; motion sensors; ambient light sensors and so on. The LED lighting unit 10 may comprise more than one LED arrangement D3 (although only one is illustrated). Each LED arrangement comprises a string of one or more LEDs, and preferably two or more LEDs.

The power supply 1 comprises an input terminal arrangement 2 for receiving a mains power supply $V_{in}$. The input terminal arrangement may comprise any standard mains terminal (e.g. a 2-pin or 3-pin plug). Here, the mains power supply $V_{in}$ is modelled as a 2-output voltage supply, including a ground, and the input terminal arrangement 2 comprises a first 2a and second 2b pin for connecting to the mains supply $V_{in}$.

The power supply also comprises an output terminal arrangement 3. The output terminal arrangement is adapted to provide power to a connected LED lighting unit 10. Here, the output terminal arrangement comprises a first 3a and second 3b pin, including a ground, for connecting to the LED lighting unit. Other embodiments for the output terminal arrangement may comprise a different number of pins (e.g. an additional pin for providing a ground, or a three-phase pin output). The output terminal arrangement 3 defines a power provided to a power rail $P_1$ of the LED lighting unit 10.

The power supply 1 comprises two power converters L1, L2. Each power converter here comprises a transformer, but alternative power converters are also envisaged, such as matrix converters or switched mode power supplies.

A first power converter L1 is designed or tuned for converting a received mains power supply $V_{in}$ into a first power level. A second power converter L2 is designed or tuned for converting a received mains power supply $V_{in}$ into a second, different power level. In this way, there are two different power converters designed for providing a respective two, different power levels.

In particular, the first power converter is more efficient than the second power converting at converting the mains power supply when the converted mains power supply is at a first non-zero power level; and the second power converter is more efficient than the first power converting at converting the mains power supply when the converted mains power supply is at a second, different non-zero power level.

The power levels may differ by more than 1%, more than 5%, more than 50% or more than 90%. For example, the difference between the first and second power levels may be no less than 1% of the value of the first power level, no less than 5% of the value of the first power level, no less than 50% of the value of the first power level or no less than 90% of the value of the first power level. In an example, the first power level is in the region of 40 W and the second power level is in the region of 0.5 W.

The phrase "designed to convert the mains power supply into a first/second power level" means that the power converter is designed so as to be more/most efficient when converting the mains power supply into the first/second power level, when compared to providing other power levels. Each power converter L1, L2 can thereby be designed to efficiently provide a certain power level. Efficiency is measurable by comparing a power at a power converter's input to a (useful) power at a power converter's output, as would be well known by the skilled person.

It is, of course, recognized that an actual power level provided by a converter may depend upon the amount of power drawn by a load connected thereto (especially for a simple transformer-based converter that converts a mains supply). However, the skilled person would appreciate that different power converters can be designed (e.g. having different components values, formed of a different number of windings and/or material(s), having a different structure and so on) so as to be particularly efficient when providing a certain power level, i.e. "designed to convert . . . into a first/second power level".

In examples, the first power converter is more efficient than the second power converter at converting the mains power supply when the converted mains power supply is within a first range of powers; and the second power converter is more efficient than the first power converter at converting the mains power supply when the converted mains power supply is within a second, different range of powers. The first range of powers includes the first power level, and the second range of power includes the second power level.

A controller, here comprising a first switch S1 and a second switch S2, controls which power converter L1, L2 provides power to the output terminal arrangement 3 and thereby which power converter provides power to the power rail $P_1$ of a connected LED lighting unit from which components of the LED lighting unit draw power. The controller may control connections within the power supply to control which power converter delivers or provides power to the output terminal arrangement.

In particular, the power supply 1 is designed so that the output of either the first power converter L1 or the second power converter L2 can be connected (either directly or via further circuitry) to the same pins of the output terminal arrangement. The controller switches or defines which of the first and second power converters L1, L2 provides power to these pins of the output terminal arrangement by controlling connections (e.g. opening or closing switches) within the power supply.

Thus, the first L1 and second L2 power converters are positioned in parallel, so that an output of each power converter is provided at a same node or nodes. The power converters are controlled to selectively switch which power converter provides the output at this node or nodes.

A LED lighting arrangement 10 connected to the output terminal arrangement may therefore draw power converted by the first power converter L1 or power converted by the second power converter L2 from the same pin(s) 3a of the output terminal arrangement 3.

Switches, such as the first switch S1 and second switch S2, may be formed from any known switch for interrupting/diverting current, such as a MOSFET or other transistor.

First D1 and second D2 diodes rectify a power supply provided by the first and second power converters L1, L2 respectively. A smoothing capacitor C is provided to convert the rectified power supply (from the first/second power converter) to a DC signal. Thus, the diodes D1, D2 and capacitor C effectively act as an AC-DC converter, and can be used to make the first and/or second power converters L1, L2 act as flyback converters. Certain components, such as capacitor C, may be shared by the two power converters for the purposes of efficiency.

The diodes D1, D2 and capacitor C may be replaced by other suitable AC-DC converters or circuitry. For example, the diodes D1, D2 may be replaced by other rectifying circuitry. In some embodiments, such converters are integrated into the power converters L1, L2 and can be considered to form part of a power converter.

A first power level may be a power sufficient for driving the LED lighting unit in an ON-state (e.g. when the LED arrangement(s) D3 are controlled to emit light and the other component(s) R also draw power). A second power level may be a power sufficient to drive the LED lighting unit in a STANDBY-state (e.g. when the LED arrangement(s) D3 is controlled to not emit light and only the other component(s) R draw power).

Thus, the second power level may be lower than the first power level. For example, the second power level may be smaller than 50% or 90% of the first power level. For example, the first power level may be in the region of 40 W and the second power level may be in the region of 0.5 W.

In this way, the first power converter may be a "high power converter" and the second power converter may be a "low power converter".

However, the precise values of the first and second power levels will vary depending upon implementation details (e.g. based on properties of the LED lighting unit 10 for which a power supply is designed).

The controller may also be configured to operate in a state in which neither the first or second power supplies L1, L2 provide power to the output terminal arrangement (e.g. both are disconnected from the input and/or output). This effectively places the LED unit in an OFF-state, as the power supply does not provide any power to the LED lighting unit.

From the foregoing, it is clear the power generated by each power converter can be selectively provided to the output terminal arrangement, so that a connected LED lighting unit 10 is able to draw power converted by different power converters over the same wires (e.g. at a same power rail).

In the illustrated example, the outputs of the power converter are permanently connected to the output terminal arrangement, and the controller controls whether a power converter is able to draw/convert power from the mains power supply $V_{in}$. A first switch S1 controls whether the first power converter L1 draws power from the mains power supply. A second switch S2 controls whether the second power converter L2 draws power from the mains power supply. Thus, when controlled to not provide power to the output terminal arrangement, a power converter may be disconnected from the mains supply. This improves an efficiency of the overall power supply 1.

However, the controller may instead control whether an output of a power converter is connected to the output terminal arrangement 3 (e.g. and an input of each power converter may be permanently connected to the input terminal arrangement). For example, in an embodiment, the first and second switches S1, S2 may instead be positioned on the other side of the power converters (i.e. the "output side" of the power converters).

In another example, the controller comprises a single switch adapted to switch a connection to the output terminal arrangement between an output of the first power converter and an output of the second power converter (e.g. using a single pole, double throw switch). In such embodiments, an input of each power converter may be permanently connected to the input terminal arrangement.

Similarly, in an example, the controller may comprise a single switch adapted to switch a connection to the input terminal arrangement between an input of the first power converter and an input of the second power converter (e.g. using a single pole, double throw switch). In such embodiments, an output of each power converter may be permanently connected to the output terminal arrangement.

The controller may further comprise control logic (not shown), such as a microprocessor or field-programmable gate array. The control logic may be adapted to control an operation of the switches S1, S2 (or switch, depending on the embodiment) and may operate, for example, in response to a command or user input. Thus, the control logic may respond to a request to change a state of the LED lighting unit.

In yet other examples, the control logic may be responsive to a change in state of the LED lighting unit. For example, if the LED lighting unit switches from an ON-state to a STANDBY-state (e.g. the LED arrangement(s) are disconnected), the control logic may be able to detect the change in state and control the connections to/from the power converters L1, L2 appropriately.

In an example, the control logic may be responsive to a power drawn by a connected the LED lighting unit (e.g. as sensed by a power meter). In the following embodiments of such an example, it is assumed that the first power level is higher than the second power level.

In such an example, in response to a power drawn by the LED lighting unit being less than a predetermined threshold, the controller may control connections so that the second power converter provides power to the output terminal arrangement, and thereby the LED lighting unit. In response to a power drawn by the LED lighting unit being greater than the predetermined threshold, the controller may control connections so that the first power converter provides power to the output terminal arrangement.

The value of the predetermined threshold may be defined by the first and second power levels for which the first and second power converters are respectively designed. In a simple embodiment, the predetermined threshold may be equal to the value of the second power level for which the second power converter is designed. In another embodiment, the predetermined threshold may be defined by (e.g. equal to) the greatest power level for which the second power converter is more efficient at providing power than the first power converter. The predetermined threshold may therefore vary based on implementation details.

The predetermined threshold may be subject to hysteresis to take account of natural variations in a drawn power, and prevent unnecessary modifications by the controller. Thus, there may be a first predetermined threshold that defines when the controller switches from using the first power converter to provide power to the output terminal arrangement to using the second power converter to provide power to the output terminal arrangement, and a second (different) predetermined threshold that defines from the controller switches from using the second power converter to provide power to the output terminal arrangement to using the first power converter to provide power to the output terminal arrangement.

Where the first power converter is designed to provide a higher power level than that for which the second power converter is designed, the first predetermined threshold is lower than the second predetermined threshold.

The first predetermined threshold and second predetermined threshold may be defined by the greatest power level for which the second power converter is more efficient at providing power than the first power converter. For example, the first predetermined threshold may be equal to this greatest power level, and the second predetermined threshold may be a set value or percentage greater than (e.g. 5% greater or 10% greater) than this greatest power level.

In other examples, the first and second predetermined thresholds are defined by the first and/or second power levels for which the first/second power converters are designed. For example, the first predetermined threshold may be equal to the second power level, and the second predetermined threshold may be a set value or percentage greater than (e.g. 5% greater or 10% greater) the second power level.

In some embodiments, the first and second power levels may be further distinguished from one another by providing a different voltage level to the output terminal arrangement, and thereby a connected LED lighting unit 10.

In other words, the first power converter L1 may be designed to provide a first (non-zero) voltage level and the second power converter L2 may be designed to provide a second, different (non-zero) voltage level. Where the power converters each comprise a transformer, different voltage levels may be provided by using different winding ratios, although other methods would also be known to the skilled person.

In some examples, the first voltage level may be a sufficiently high voltage to drive the LED arrangement D3, whereas the second voltage level may not be sufficiently high enough to drive the LED arrangement D3 (but is sufficient to drive the other component(s) R).

In particular, the first voltage level may be greater than or equal to a voltage drop across an LED arrangement D3, and the second voltage level may be less than or equal to a voltage drop across the LED arrangement.

By way of explanation, a typical LED arrangement D3 may require a minimum voltage level (e.g. 15V or 45V) to drive it, due to a voltage drop across LEDs. Thus, if a voltage level below the minimum voltage level is provided to the LED lighting unit, then the LED lighting unit can be automatically placed into a STANDBY-state (in which the LEDs are not driven) without requiring a control or switch in the LED lighting unit to control whether the LED arrangement draws power from a power rail.

This enables control over the state of the LED lighting unit to take place by controlling which power converter L1, L2 supplies power to the LED lighting unit. This effectively shifts a control of the state of the LED lighting unit from the LED lighting unit to the power supply. Thus, connected LED lighting units may be simplified (by removing the control system S3 for the LED arrangement D3 from the LED lighting unit).

The precise values of the first and second voltage levels will vary depending upon implementation details (e.g. based on properties of the LED lighting unit 10 for which a power supply is designed).

However, in preferable embodiments, the first non-zero voltage level is greater than 25V and the second non-zero voltage level is less than 10V. In some examples, the first non-zero voltage level may be 45V and/or the second non-zero power voltage may be around 3.3V or 5V.

In some embodiments, the input arrangement 2 further comprises an EMI (electro-magnetic interference) filter circuit (not shown) adapted to filter the mains supply and/or a surge protection unit (not shown) to protect the power supply for power surges in the mains supply. The power converters L1, L2 may be connected to the pins 2a, 2b of the input arrangement via such additional circuitry and/or further additional circuitry.

Embodiments of the invention may comprise a luminaire formed of the power supply 1 and the LED lighting unit 10, e.g. connected together.

Figure 2:
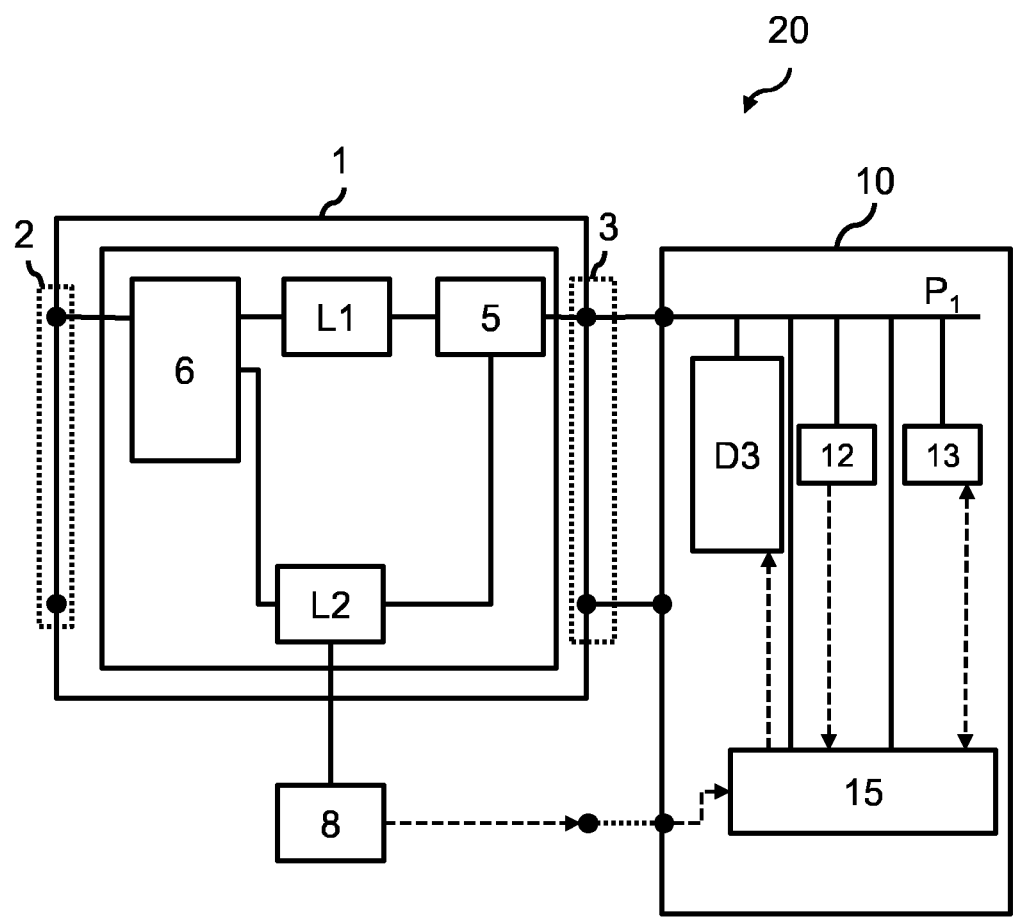
FIG. 2 is a block diagram illustrating a luminaire according to an embodiment of the invention.

FIG. 2 is a block diagram illustrating a luminaire 20 according to an embodiment of the invention. The luminaire 20 comprise a power supply 1 and a LED lighting unit 10. The power supply 1 may, by itself, form an embodiment of the invention.

The power supply 1 comprises an input terminal arrangement 2, an output terminal arrangement 3, a first power converter L1, a second power converter L2 and a controller 5.

The LED lighting unit 10 is connected to the output terminal arrangement 3 of the power supply and comprises a power rail $P_1$, an LED arrangement D3 and at least one other component 12, 13, 15. The power rail $P_1$ connects to the output terminal arrangement 2 to receive power. The LED arrangement D3 and the at least one other component are adapted to draw power from the power rail.

The first and second power converters L1, L2 of the power supply 1 are each designed for converting a mains power supply (not shown) connected to the input terminal arrangement 2 into a respective power level. The controller 5 controls which power converter L1, L2 provides power to the output terminal arrangement 3, and thereby to the power rail $P_1$ of the LED lighting unit 10. The controller 5 thereby defines which power converter supplies power at the power rail $P_1$.

The at least one other component 12, 13, 15 may comprise, for example, a communication unit 12 (such as a radiofrequency transceiver, transmitter and/or receiver) and/or a sensing unit 13.

In further embodiments, the luminaire 20 may further comprise a control module 8. The control module may be powered by one of the power converters (e.g. the second power converter L2) even if that power converter does not provide power to the LED lighting unit 10. The control module may be adapted to process and/or provide control signals for/to the LED lighting unit.

The control module 8 may be formed as an aspect of the power supply 1.

The LED lighting unit 10 may comprise, as part of the at least one other component, corresponding control logic 15 for receiving and/or processing control signals for the LED lighting unit 10. For example, the control logic 15 may control an operation of the LED arrangement D3 and/or the at least one other component 12, 13. The control logic 15 may form one of the at least one other components of the LED lighting unit (i.e. it draws power from the power line $P_1$).

The control logic 15 may receive and/or transmit communication to the control module 8. Communications between the control module 8 and the control logic 15 may take place using any known communication protocol, such as Inter-Integrated Circuit (I²C).

Although present, reference/ground wires have not been illustrated for the sake of clarity.

The skilled person would be readily capable of developing methods for controlling any described power supply or luminaire, and such methods are envisaged in the present invention. In particular, a method may comprise determining a power level drawn by a LED lighting unit connected to the power supply, and controlling which of a first and second power converter, of a herein described power supply, provides the power to be drawn by the LED lighting unit based on the determined power level.

There is also proposed the concept of computer program comprising code means for implementing any described method when said program is run on a computer. Thus, different portions, lines or blocks of code of a computer program according to an embodiment may be executed by a processor/computer to perform any herein described method.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A luminaire comprising:
    an LED lighting unit comprising at least one LED arrangement and at least one other component; and
    a power supply comprising:
        an input terminal arrangement for receiving a mains power supply;
        an output terminal arrangement connected to the LED lighting unit and configured to define a power supplied to the LED lighting unit;
        a first power converter designed to convert the received mains power supply;
        a second power converter, separate from the first power converter, designed to convert the received mains power supply;
        a controller adapted to selectively control which of the first and second power converters converts the mains power supply and provides the converted mains power supply to the output terminal arrangement, to thereby switch the power supplied to the connected LED lighting unit between a power converted by the first power converter and a power converted by the second power converter,
    wherein the first power converter is more efficient than the second power converter at converting the mains power supply when the converted mains power supply is at a first non-zero power level, wherein the second power converter is more efficient than the first power converter at converting the mains power supply when the converted mains power supply is at a second, different non-zero power level,
wherein the LED arrangement and the at least other component are simultaneously coupled to the power supply of the luminaire and are adapted to draw power from the power supply of the luminaire, and wherein the first non-zero power level is sufficient to power the at least one LED arrangement of the LED lighting unit, and the second non-zero power level is not sufficient to power the at least one LED arrangement of the LED lighting unit.

2. The luminaire of claim 1, wherein the first power converter is adapted to provide a first non-zero voltage level, and the second power converter is adapted to provide a second, different non-zero voltage level.

3. The luminaire of claim 2, wherein the first non-zero voltage level is greater than the second non-zero voltage level.

4. The luminaire of claim 2, wherein the first non-zero voltage level is greater than 25V and the second non-zero voltage level is less than 10V.

5. The luminaire of claim 2, wherein the first non-zero voltage level is greater than a voltage drop across the LED arrangement of the LED lighting unit, and the second non-zero voltage level is less than a voltage drop across the LED arrangement of the lighting unit.

6. The luminaire of claim 1, wherein the input terminal arrangement comprises:
one or more pins for receiving the mains power supply;
an EMI filter circuit adapted to filter the mains power supply; and
a surge protection unit to protect the power supply of the luminaire from power surges in the mains power supply.

7. The luminaire of claim 1, wherein the controller is adapted to:
determine whether the at least one LED arrangement of the connected LED lighting unit is drawing power; and
in response to determining that the at least one LED arrangement of the connected LED lighting unit is not drawing power, connect the second power converter to the output terminal arrangement so that power supplied to the LED lighting unit is held at the second non-zero power level.

8. The luminaire of claim 1, wherein the first power converter comprises a flyback converter.

9. The luminaire of claim 1, wherein the controller comprises a switch adapted to selectively switch a connection to the output terminal arrangement between an output of the first power converter and an output of the second power converter, to thereby switch which power converter supplies power to the output terminal arrangement.

10. The luminaire of claim 9, wherein the at least one LED arrangement is adapted to require a power level greater than the second non-zero power level in order to emit light, and the at least one other component is adapted to be active at a power level equal to or less than the second non-zero power level.

11. The luminaire of claim 10, wherein each at least one LED arrangement comprises a plurality of LEDs connected in series.

12. The luminaire of claim 10, wherein the at least one other component comprises a communication unit and/or a sensing unit.

13. The luminaire of claim 1, wherein the first non-zero power level is a single power level that is sufficient to simultaneously power both the at least one LED arrangement and the at least one other component, wherein the first power converter is tuned to the single power level such that the first power converter operates at maximal efficiency when providing the single power level.

14. The luminaire of claim 13, wherein the second non-zero power level is an other single power level that is sufficient to power the at least one other component and is insufficient to power the at least one LED arrangement, wherein the second power converter is tuned to the other single power level such that the second power converter operates at maximal efficiency when providing the other single power level.

15. The luminaire of claim 1, wherein the second non-zero power level is a single power level that is sufficient to power the at least one other component and is insufficient to power the at least one LED arrangement, wherein the second power converter is tuned to the single power level such that the second power converter operates at maximal efficiency when providing the single power level.

* * * * *